United States Patent
Tanaka

(10) Patent No.: US 7,120,507 B2
(45) Date of Patent: Oct. 10, 2006

(54) CONTROL APPARATUS AND CONTROL SYSTEM

(75) Inventor: Seigo Tanaka, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 75 days.

(21) Appl. No.: 10/615,866

(22) Filed: Jul. 10, 2003

(65) Prior Publication Data

US 2004/0010322 A1    Jan. 15, 2004

(30) Foreign Application Priority Data

Jul. 12, 2002  (JP)  ............ P2002-203358

(51) Int. Cl.
*G05B 11/01*  (2006.01)
*G05B 13/02*  (2006.01)

(52) U.S. Cl. .............. 700/20; 700/1; 700/19; 700/25; 700/52; 455/73; 455/91; 455/95; 455/100; 701/29; 701/30; 701/33; 701/36

(58) Field of Classification Search .......... 700/1, 700/19–20, 25–27, 47, 52, 53; 455/73, 91, 455/95, 100; 701/29–33, 36
See application file for complete search history.

(56) References Cited

U.S. PATENT DOCUMENTS

| | | | | |
|---|---|---|---|---|
| 4,320,387 A | * | 3/1982 | Powell ............... | 705/39 |
| 5,446,846 A | * | 8/1995 | Lennartsson ......... | 710/100 |
| 5,859,415 A | * | 1/1999 | Blomqvist et al. ...... | 235/384 |
| 6,158,009 A | * | 12/2000 | Ayukawa et al. ....... | 713/201 |
| 6,230,082 B1 | * | 5/2001 | Harada et al. ......... | 701/1 |
| 6,315,083 B1 | | 11/2001 | Schuster et al. | |
| 6,334,080 B1 | * | 12/2001 | Iwai et al. ............ | 701/48 |
| 6,756,899 B1 | * | 6/2004 | Kobayashi et al. ..... | 340/539.1 |
| 6,758,089 B1 | * | 7/2004 | Breed et al. ........... | 73/146 |
| 6,873,252 B1 | * | 3/2005 | Ono .................... | 340/436 |
| 2001/0042137 A1 | * | 11/2001 | Ota et al. ............ | 709/248 |
| 2002/0083141 A1 | * | 6/2002 | Goto ................... | 709/206 |
| 2002/0157012 A1 | * | 10/2002 | Inokuchi et al. ....... | 713/193 |
| 2002/0194299 A1 | * | 12/2002 | Yasaki et al. .......... | 709/217 |
| 2004/0010688 A1 | * | 1/2004 | Matsuzaki et al. ...... | 713/169 |
| 2004/0107352 A1 | * | 6/2004 | Yui et al. ............. | 713/185 |
| 2004/0155100 A1 | * | 8/2004 | Imaizumi et al. ....... | 235/375 |

FOREIGN PATENT DOCUMENTS

| | | |
|---|---|---|
| CN | 1185223 A | 6/1998 |
| EP | 0 838 788 A1 | 4/1998 |
| JP | A 7-9926 | 1/1995 |
| JP | A 9-160602 | 6/1997 |

* cited by examiner

*Primary Examiner*—Ramesh Patel
(74) *Attorney, Agent, or Firm*—Oliff & Berridge, PLC

(57) ABSTRACT

A control apparatus includes a communication unit for conducting the data communication. Identification information is assigned to the control apparatus. The control apparatus further includes a storage unit having an identification information table storing information containing the identification information and the identification information of other control apparatuses, which are connected to and communicate with the control apparatus.

20 Claims, 4 Drawing Sheets

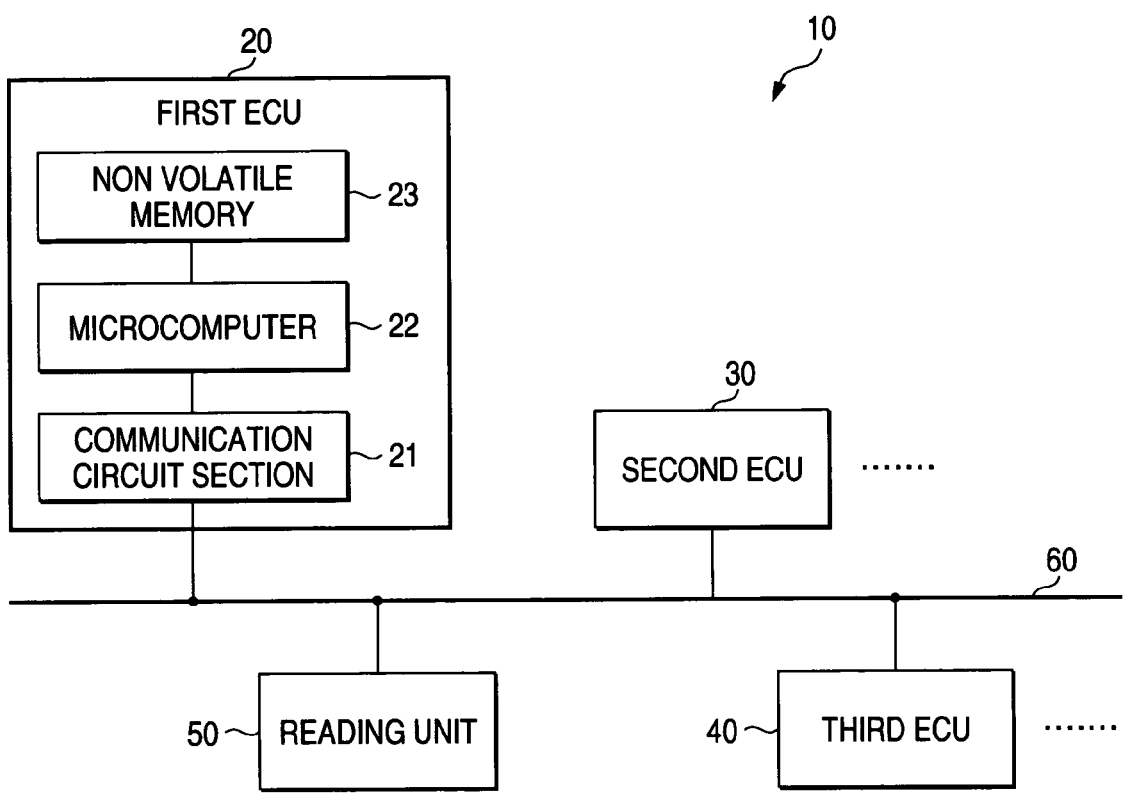

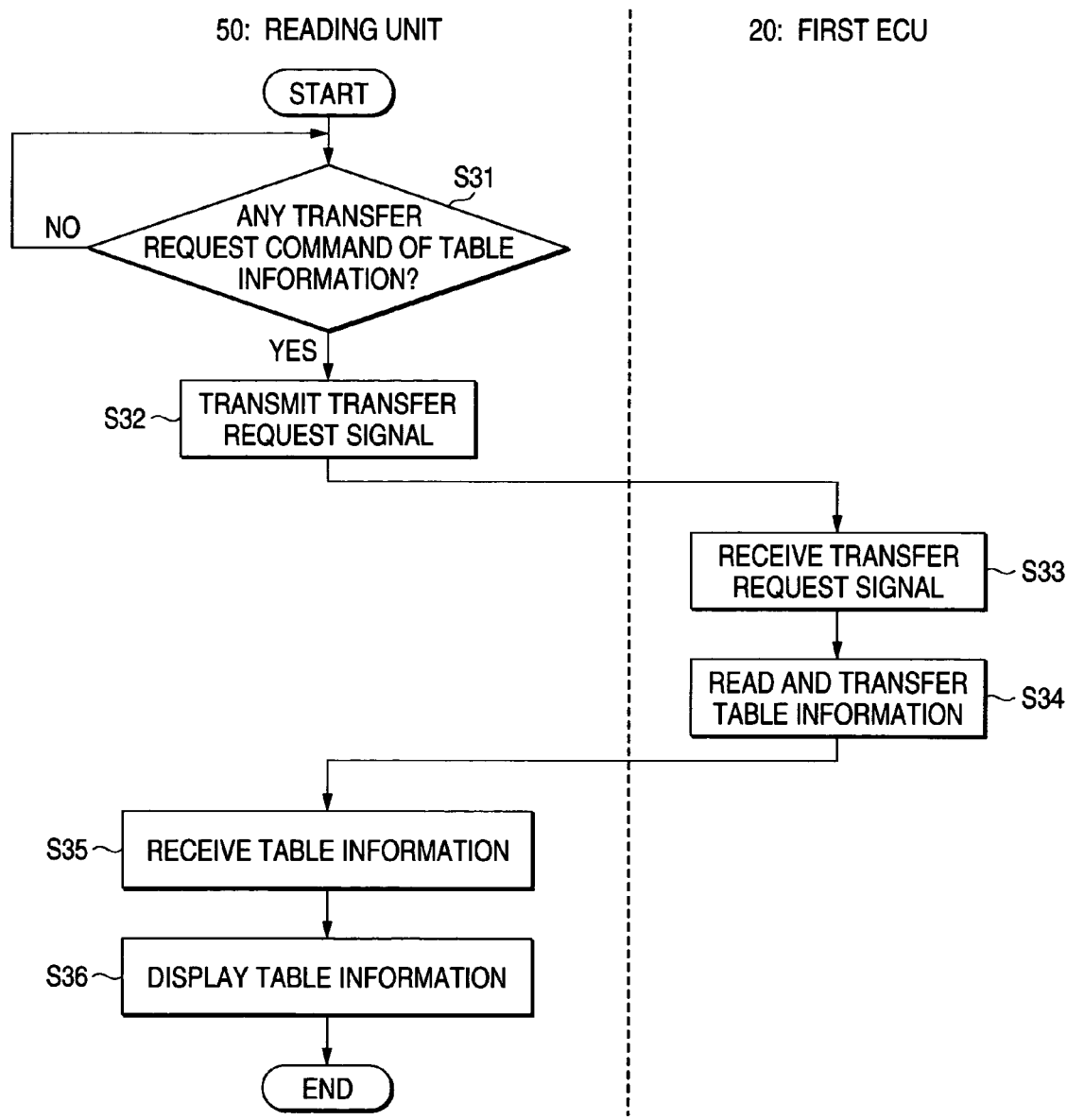

CONTROL APPARATUS AND CONTROL SYSTEM

The present disclosure relates to the subject matter contained in Japanese Patent Application No. 2002-203358 filed on Jul. 12, 2002, which is incorporated herein by reference in its entirety.

BACKGROUND OF THE INVENTION

1. Field of the Invention

The present invention relates to a control apparatus and a control system, and more particularly to a control apparatus having a communication unit for conducting the data communication, and a control system including a plurality of control apparatuses connected to communicate with each other.

2. Description of the Related Art

In recent years, a vehicle is mounted with various control units including an engine control unit for controlling the fuel injection or ignition timing of the engine, an ABS control unit for controlling an anti-lock brake system (ABS), and an air bag control unit for controlling the expanding operation of an air bag.

Also, a control system equipped with a so-called vehicle LAN in which these control units are connected via a communication line has been introduced. For example, a sensor signal detected by the engine control unit is sent via the communication line to another control unit (ABS control unit, etc.), which then can conduct efficient control utilizing the received sensor signal.

By the way, many of troubles in the control units occurs intermittently while driving or don't continue. Usually, these control units have a function of storing content of the trouble in a memory through the self-diagnosis.

In a service factory of dealers, when a trouble occurs, a specific reader is connected to a control unit to read a self ID code or a trouble code stored in the memory of the control unit, and read an exchange and repair history of the control unit or diagnose the trouble content with reference to a database for ID code or trouble code possessed by the dealers.

However, because the general used vehicle shops that are not the dealers could not refer to the above database, there was a problem that the information of exchange and repair history of individual control apparatuses mounted on the vehicle could not be directly confirmed.

Also, the information of the ID code regarding the control apparatus, which is mounted to a vehicle at present, is only stored in the memory of the control apparatus. Thus, when a new control apparatus is mounted due to a failure, the information about the control apparatus previously mounted necessarily disappeared without leaving information that the control apparatus was exchanged. As a result, there is a problem that the exchange and repair history cannot be correctly grasped.

Also, because the information of the exchanged control apparatus in the memory might be rewritten incorrectly by a dedicated writing device, there is a problem that the correct exchange and repair history is difficult to grasp.

SUMMARY OF THE INVENTION

This invention has been achieved to solve the above-mentioned problems. It is an object of the invention to provide a control apparatus and a control system including control apparatuses connected communicably. Identification information of the control apparatus is stored and shared among all the control apparatuses. Thereby, the exchange and repair history of each control apparatus is easily confirmed at no extra cost. Also, the identification information is protected from being improperly rewritten.

In order to achieve the above object, according to a first aspect of the invention, a control apparatus includes a communication unit for conducting data communication, and a storage unit including a table storing identification information assigned to the control apparatus and identification information of another control apparatus.

In the first aspect, the identification information of the control apparatus's own and the identification information of another control apparatus are stored in the identification information table. Accordingly, the identification information of the control apparatus's own and the identification information of another control apparatus can be shared. Therefore, in addition to the identification information of the control apparatus's own, the identification information of another control apparatus can be read out. Thereby, the exchange and repair history of the control apparatus can be confirmed by referring to the identification information table of the control apparatus. The information of the identification information table is enhanced in practical use.

Also, according to a second aspect of the invention, a control system includes a plurality of control apparatuses connected to each other to communicate with each other. Each of control apparatuses includes a first transmission unit for transmitting identification information of the control apparatus's own to the other control apparatuses; a reception unit for receiving identification information of the other control apparatuses transmitted from the other control apparatuses; and a first storage unit for storing the identification information of the control apparatus's own and the identification information of the other control apparatuses to which registration update information is added in a table of the control apparatus's own.

In the second aspect, each control apparatus transmits the identification information of the control apparatus's own to the other control apparatuses, and receives the identification information transmitted from the other control apparatuses. The identification information of the control apparatus's own and the identification information of the other control apparatus are stored to which the registration updating information is added in the identification information table of the control apparatus's own. Accordingly, each control apparatus stores the identification information table containing the same identification information in the storage unit. Thereby, the identification information can be shared, and a false act in the exchange and repair history of the control apparatuses such as improperly rewriting the identification information is checked.

Also, since the identification information of the other control apparatuses are acquired employing the communication unit for conducting the communication with another control apparatus, the identification information table is created without providing a specific acquisition unit separately, and at no extra cost.

Also, according to a third aspect of the invention, the first storage unit conducts the storage at a time of first energization after the control apparatuses are connected to each other.

In the third aspect, the first storing process by the first storing unit is performed at a time of the first energization after the control apparatuses are connected. Thereby, the control apparatus stores the identification information at the initialization of the control apparatus in the identification information table of the control apparatus's own. Accordingly, the control apparatuses can share the same identification information after the first energization.

Also, according to a fourth aspect of the invention, each of control apparatuses further includes a comparison unit for comparing table information read out from the table of the control apparatus's own and table information read out from the table of the other control apparatuses. When each of comparison units concludes that at least one of the table information is different from the other table information, each of first storage unit stores all the identification information to which new registration update information is added in each of tables.

In the fourth aspect, when any control apparatus having different table information is connected, the identification information of the control apparatus having different table information together with the identification information of the other control apparatuses is stored, with the new registration updating information added thereto, in the self identification information table. Therefore, the information of the new control apparatus exchanged is appropriately stored in the identification information table, so that the identification information table containing the correct information is created.

Also, in a fifth aspect of the invention, each of control apparatuses further includes a second transmission unit and a second storage unit. When each of comparison units concludes that the at least one of the table information is different from the other table information, each of second transmission units transmits history information stored in the table of the control apparatus's own to the control apparatus including the at least one of the table information. Each of second storage units stores the history information transmitted by the second transmission units in the table of the control apparatus's own.

In the fifth aspect, the history information shared in the system is stored in the identification information table of the control apparatus having different table information that is exchanged. Thereby, even when the control apparatus in the system is exchanged, the information of the identification information table is shared among the control apparatuses, so that each control apparatus can read the same history information with consistency.

Also, according to a sixth aspect of the invention, the comparison units conducts the comparison at a predetermined timing.

In the sixth aspect, the comparison process is performed by the table information comparing means at a predetermined timing in turning on the power or after the elapse of a certain time. Thereby, the identification information is appropriately shared, while keeping the information of the identification information table of each control apparatus consistent.

Also, in a seventh aspect of the invention, the system of the second aspect further includes a reading unit for reading table information stored in each of tables of the control apparatuses. The reading unit includes a transmission request unit for requesting at least one of the control apparatuses to transmit the table information stored in the table of the at least one of the control apparatuses; a notification unit for notifying the table information, which is transmitted on the basis of the request by the transmission request unit; and each of control apparatuses includes a third transmission unit for transmitting the table information stored in the control apparatus's own to the reading unit on the basis of the request by the transmission request unit.

In the seventh aspect, the reading unit makes a transfer request to the control apparatus to transfer the table information stored in the identification information table. The table information transferred from the control apparatus via the reading unit is notified to the user. Accordingly, the user can grasp the correct information about the exchange and repair history of the control apparatus in the system.

Also, according to an eighth aspect of the invention, the notification unit includes an indicator lamp mounted on a vehicle.

In the eighth aspect, the control apparatus that is exchanged or repaired is notified to the user by flashing the indicator lamp so that the exchange or repair of the control apparatus is clearly known. Thereby, the information including the exchange and repair history can be directly detected from the vehicle at no extra cost.

According to a ninth aspect of the invention, a control system includes a first control apparatus, and a second control apparatus connected to the first control apparatus. Each of first and second control apparatuses includes a first transmission unit, a reception unit, and a first storage unit. The first transmission unit of the first control apparatus transmits identification information of the first control apparatus to the second control apparatus. The first transmission unit of the second control apparatus transmits identification information of the second control apparatus to the first control apparatus. The reception unit of the first control apparatus receives the identification information of the second control apparatus transmitted by the first transmission unit of the second control apparatus. The reception unit of the second control apparatus receives the identification information of the first control apparatus transmitted by the first transmission unit of the first control apparatus. The first storage unit of the first control apparatus stores into a table of the first control apparatus the identification information of the first and second control apparatuses to which registration update information is added. The first storage unit of the second control apparatus stores into a table of the second control apparatus the identification information of the first and second control apparatuses to which the registration update information is added.

BRIEF DESCRIPTION OF THE DRAWINGS

FIG. 1 is a block diagram schematically showing the essence of a vehicle control system according to an embodiment (1) of the present invention.

FIG. 2 is a diagram showing one example of the data structure of an identification information table stored in a non-volatile memory of an ECU constituting a vehicle control system according to the embodiment (1).

FIG. 5 is a flowchart showing a reading operation that is performed by reading unit and the ECUs constituting the vehicle control system according to the embodiment (1).

DETAILED DESCRIPTION OF THE PREFERRED EMBODIMENTS

Figure 3:
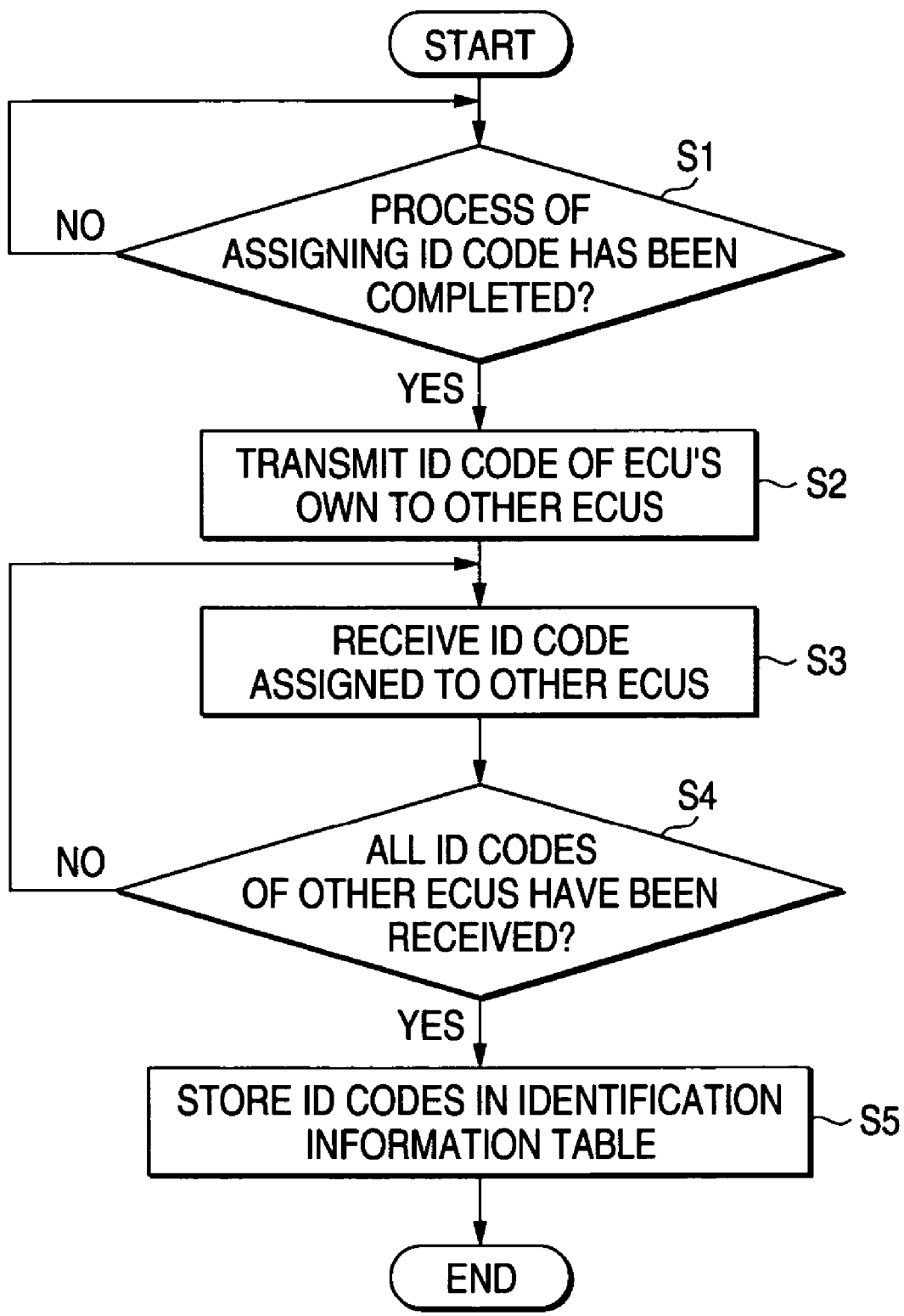
FIG. 3 is a flowchart showing a storing operation of the ID code that is performed by the ECUs constituting the vehicle control system according to the embodiment (1).

The preferred embodiments of a control apparatus and a control system according to an embodiment of the present invention will be described below with reference to the accompanying drawings.

FIG. 1 is a block diagram schematically showing the essence of a vehicle control system according to this embodiment.

In FIG. 1, reference numeral 10 denotes a vehicle control system. The vehicle control system includes a first electronic control unit (hereinafter an ECU) 20 for engine control, a second ECU 30 for air-back control, a third ECU 40 for ABS control, and a reading unit 50, which are connected via a communication line 60.

Since the ECUs 20, 30 and 40 have the almost same configuration, the schematic configuration of the first ECU 20 will be described below.

The first ECU 20 includes a communication circuit section 21, which is a communication unit for conducting the data communication with other ECUs 30 and 40, a microcomputer for controlling each section of the first ECU 20, and a non-volatile memory 23 that is a memory unit.

The communication circuit section 21 efficiently conducts the data communication with other ECUs 30 and 40 connected via the communication line 60 on the basis of the control of the microcomputer 22, transmits/receives identification information (ID code), and conducts the data communication with the reading unit 50.

The microcomputer 22 performs a process for taking in a signal from various sensors (not shown) via an input circuit (not shown), making various calculation, and outputting a control signal for driving various actuators (not shown) via an output circuit (not shown) to various actuators on the basis of a calculated control signal. The microcomputer 22 also performs a process for storing the ID code assigned to the ECU in which the microcomputer 22 is contained in an identification information table ine the non-volatile memory 23, transmitting the ID code of the ECU to other ECUs 30 and 40 and storing the ID code transmitted from other ECUs 30 and 40 in the identification information table. The microcomputer 22 includes a CPU, a RAM, and a ROM (which are not shown).

The non-volatile memory 23 includes the identification information table for storing information including the ID code of the first ECU 20 and the ID codes of the other ECUs 30 and 40, and may be a data rewritable flash memory.

FIG. 2 is a diagram showing one example of the data structure of the identification information table in the non-volatile memory 23 of the first ECU 20.

The identification information table contains a registration number that is registration update information, the ID code of the ECU containing the memory 23 that is the identification information, and the ID codes of other ECUs 30 and 40 connected via the communication line 60.

The registration number, which is the registration update information, is given every time the ID code is updated. The ID code given at a time of assembly or shipment in the vehicle manufacturing factory is stored in a space of the registration No. 1. Thereafter, every time any ECU is exchanged, the new registration number is given, the new ID code of exchanged ECU and the ID codes of other ECUs are stored (the identification information of the first ECU when exchanged is stored as the registration No. 2 in FIG. 2).

In this manner, the identification information table contains the information about the ID codes of all the ECUs 20, 30 and 40 connected via the communication line 60 from the time of assembly or shipment (new car) to the present. The same identification table is stored in the non-volatile memories of other ECUs 30 and 40.

The reading unit 50 reads information from the identification information table in the non-volatile memory of each of the ECUs 20, 30 and 40. For example, one function of a navigation apparatus may serve as the reading unit 50.

For example, a maintenance menu is provided (displayed) in a main menu of the navigation apparatus. If a read button for the identification information table, which is provided (displayed) on a screen of the maintenance menu, is pressed, the table information of the identification information table read from the first ECU 20 is processed and displayed in a predetermined format on the screen. As a result, it becomes possible to confirm the ID code of each ECU 20, 30, and 40 and confirm the exchange and repair history of each ECU easily.

Referring to a flowchart of FIG. 3, an operation of storing the ID code, which is performed by the ECUs constituting the vehicle control system 10 according to the embodiment, will be described below. This operation is performed at a time of first energization in assembling or shipping the vehicle. An ID code assigning unit (not shown) for assigning the ID code to each of the ECUs 20, 30 and 40 is connected to the communication line 60. Herein, an operation of the first ECU 20 will be described below (the same operation is performed by the other ECUs 30 and 40).

First of all, at step S1, it is determined whether or not a process that the ID code assigning unit assigns the ID code after the energization has been completed. If the assignment of the ID code has been completed, the operation proceeds to step S2. If not, the operation returns to step S1.

At step S2, the ID code assigned to the ECU (the first ECU 20), which performs this process, is transmitted to the other ECUs 30 and 40. Then, the operation proceeds to step S3. At step S3, the ID code assigned to the other ECUs 30 and 40 is received. Then, the operation proceeds to step S4.

At step S4, it is determined whether or not all the ID codes of other ECUs 30 and 40 are received. If it is concluded that all the ID codes of other ECUs 30 and 40 are received, the operation proceeds to step S5. On the other hand, if at step 4, it is concluded that all the ID codes of other ECUs 30 and 40 are not received, the operation returns to step S3.

At step S5, the ID codes are stored in the identification information table of the non-volatile memory 23, in which the registration number is set to 1. The ID code of the ECU 20 and the ID codes of other ECUs 30 and 40 are stored. Then, the operation is ended.

Figure 4:
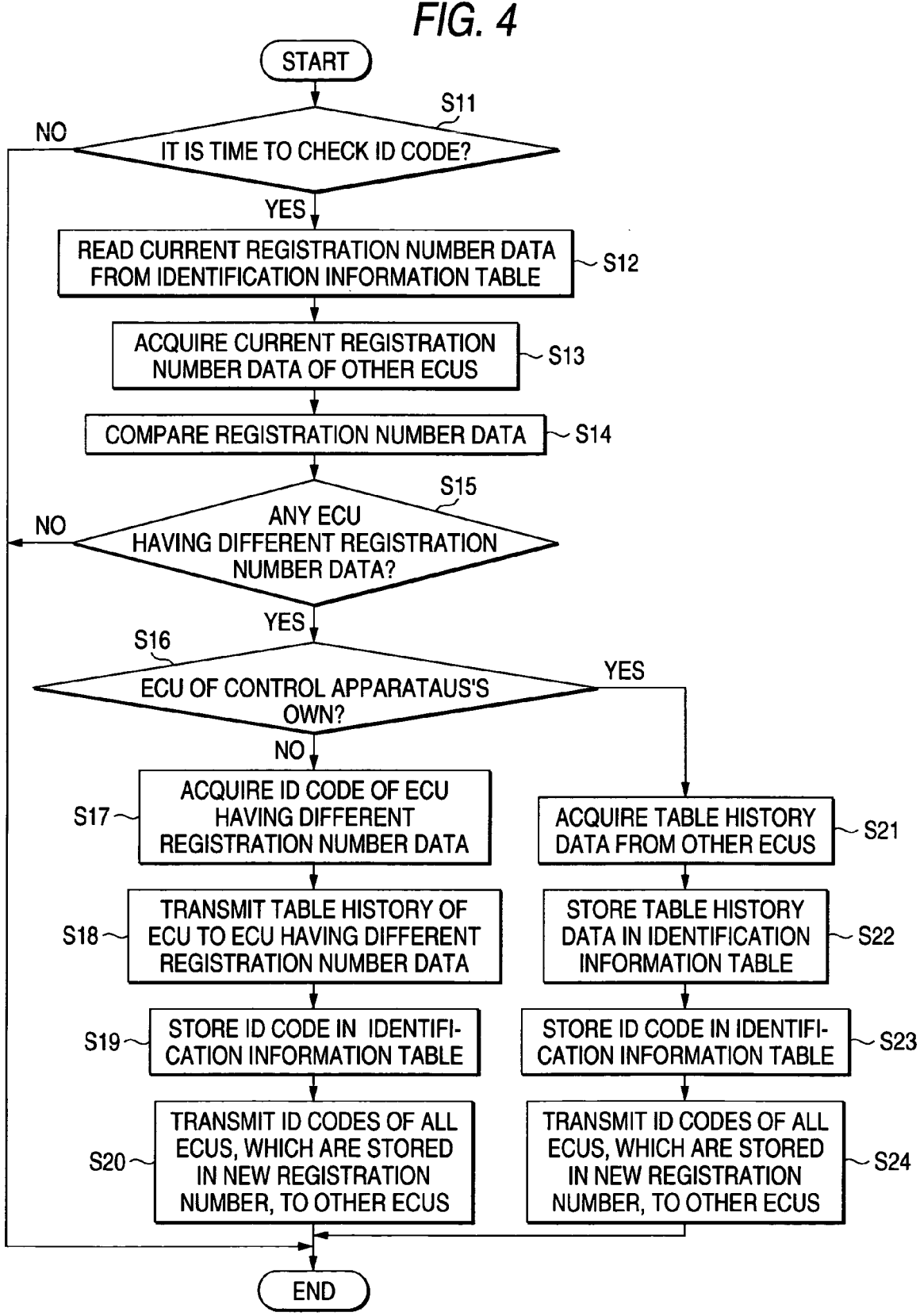
FIG. 4 is a flowchart showing an updating and storing operation of the ID code that is performed by the ECUs constituting the vehicle control system according to the embodiment (1).

Referring to a flow chart of FIG. 4, an operation of updating and storing the ID code will be described below. The ECUs constituting the vehicle control system 10 according to the embodiment performs this operation. Herein, it is supposed that the first ECU 20 checks the ID code.

First of all, at step S11, it is determined whether or not it is time to check the ID code (at a time when the power is turned on or at a time after a predetermined period has been elapsed). If it is concluded that it is the time to check the ID code, the operation proceeds to step S12. If not, the operation is ended.

At step S12, the current registration number data is read from the identification information table of the non-volatile memory 23. Then, the operation proceeds to step S13. At step S13, the current registration number data of the identification information table in the non-volatile memory of the other ECUs 30 and 40 is acquired. Then, the operation proceeds to step S14.

At step S14, the registration number data of the ECU 20, which performs this process, and the registration number data of other ECUs 30 and 40 are compared. Then, the operation proceeds to step S15. At step S15, it is determined whether or not there is an ECU having different registration number data from the other EUCs. If it is concluded that there is the ECU having different registration number data, the operation proceeds to step S16. If not, the operation is ended.

At step S16, it is determined whether or not the ECU having different registration number data is the ECU 20, which performs this operation. If it is concluded that the ECU having different registration number data is not the ECU 20, the operation proceeds to step S17.

At step S17, the ID code of the ECU (any of ECU 30, 40, . . .) having different registration number data is acquired. Then, the operation proceeds to step S18. At step S18, the history data of the identification information table for the ECU 20, which performs this operation (common data is stored in the ECUs except for the ECU having different registration number data) is transmitted to the ECU having different registration number data. Then, the operation proceeds to step S19.

On the other hand, the ECU having different registration number receives the table history data transmitted at step S18, and stores it in the identification information table thereof.

At step S19, the ID code of the ECU having different registration number data is stored in the identification information table along with the ID codes of other ECUs (except for the ECU having different registration number data) with the ID codes assigned a new registration number. Then, the operation proceeds to step S20.

At step S20, the ID codes of all the ECUs stored in the new registration number row are transmitted to the other ECUs 30, 40, . . . Then, the operation is ended.

On the other hand, the other ECUs 30, 40, . . . receive the ID codes of all the ECUs 20, 30, 40, . . . transmitted from the first ECU 20 at step S20 and stored in the new registration number row. The other ECUs 30, 40, . . . store these received ID codes with the new registration number attached in the identification information table thereof.

If at step S16, it is concluded that the ECU having different registration number data is the ECU 20, which performs this operation, the operation proceeds to step S21. At step S21, the history data of the identification information table is acquired from any of other ECUs 30, 40, . . . Then, the operation proceeds to step S22.

At step S22, the acquired table history data is stored in the identification information table. Then, the operation proceeds to step S23.

At step S23, the latest ID codes of the other ECUs 30, 40, . . . stored in the identification information table along with the ID code of the ECU 20, with the new registration number attached. Then, the operation proceeds to step S24.

At step S24, the ID codes of all the ECUs stored in the new registration number row are transmitted to the other ECUs 30, 40, . . . Then, the operation is ended.

On the other hand, the other ECUs 30, 40, . . . receive the ID codes of all the ECUs transmitted from the first ECU 20 at step S24, and store them in the identification information table thereof, with the new registration number attached.

Referring to a flow chart of FIG. 5, an operation for reading the table information, which is performed by the reading unit 50 and the ECUs 20, 30, 40, . . . constituting the vehicle control system 10 according to the embodiment will be described below.

The identification information table of each ECU 20, 30, 40, . . . stores the history information of the ID codes for all the ECUs from the time of new car to the present. The same table information can be read from each ECU. In this process, it is supposed that the information of the identification information table is read from the first ECU 20.

First of all, at step S31, it is determined whether or not a transfer request command for the table information stored in the identification information table of the first ECU 20 is given (history information of the ID codes for all the ECUs from the time of new car to the present), for example, whether or not a read button of the table information is pressed. If the transfer request command for the table information is given, the operation proceeds to step S32. On the other hand, if the transfer request for the table information is not given, the operation proceeds to step S31.

At step S32, a transfer request signal of the table information is transmitted to the first ECU 20. Then, the operation proceeds to step S33.

At step S33, the first ECU 20 receives the transfer request signal output from the reading unit 50. Then, the operation proceeds to step S34. At step S34, the table information stored in the identification information table of the non-volatile memory 23 is read out and transferred to the reading unit 50. Then, the operation goes to step S35.

At step S35, the reading unit 50 receives the table information of the identification information table transferred from the first ECU 20. Then, the operation proceeds to step S36. At step S36, the reading unit 50 processes the received table information so that the history of the ID codes of all the ECUs from the time of the new car to the present is made clear and displays the processed table information on the screen of the navigation apparatus having a function as the reading unit. Then, the operation is ended.

In the above embodiment, the identification information table is read from the first ECU 20. However, in another embodiment, the reading unit 50 may include a setting unit, which can make such settings that only the history information of the ID code for the self ECU is read from each of the ECUs 20, 30, 40, . . . , and transferred to the reading unit 50, or the current ID codes for all the ECUs are only read and transferred to the reading unit 50, or the ID code of a specific ECU alone is read and transferred to the reading unit 50.

In the ECUs 20, 30, 40, . . . according to the above embodiment, the self ID code and the ID codes of the other ECUs are stored in the identification information table. Accordingly, the self ID code and the ID codes of the other ECUs are shared, whereby in addition to the self ID code, the ID codes of the other ECUs can be read out. The information of the identification information table is utilized to confirm the exchange and repair history for the ECU.

In the vehicle control system 10 according to this embodiment, each ECU 20, 30, 40, . . . transmits the self ID code to the other ECUs, and receives the ID codes from the other ECUs. Each ECU 20, 30, 40, . . . can store the self ID code and the ID codes of the other ECUs in the identification information table thereof with the registration number attached. Accordingly, each ECU 20, 30, 40, . . . stores the same identification information table containing the ID codes in the non-volatile memory thereof. Therefore, the ID codes are shared among the ECUs. A false act in the exchange and repair history of the ECU such as improperly rewriting the ID code can be checked.

Since the identification information of the other ECUs is acquired utilizing the communication circuit section 21 for conducting the data communication with the other ECUs, the identification information table is created without providing a specific acquiring unit, and at no extra cost.

Also, the first storing process of the ID code is performed at a time of first energization after connecting the ECUs 20, 30, 40, . . . Therefore, each ECU stores the identification information at the initialization (new car) of each ECU in each identification information table. Accordingly, each ECU 20, 30, 40, . . . shares the ID codes of all the ECUs after first energization.

Also, when the vehicle control system 10 is connected to the ECU having different table information due to exchange, the ID code of the ECU having different table information together with the ID codes of the other ECUs are stored in the self identification information table, with the new registration number attached. Therefore, the information of new ECU, which is provided by exchange, is appropriately stored in the identification information table. The identification information table containing the correct information is created.

Also, the history information shared by the vehicle control system 10 is stored in the identification information table of the ECU having different table information that is exchanged. Therefore, even when any ECU in the vehicle control system 10 is exchanged, the information of the identification information table is shared.

Also, at an appropriate timing when the power is turned on, or after the predetermined period has been elapsed, the comparison process of the table information is performed. Therefore, the ID codes are appropriately shared. The identification information table of each ECU 20, 30, 40, . . . is kept consistent.

Also, the reading unit 50 can make a transfer request for the table information stored in the identification information table to each ECU 20, 30, 40, . . . Therefore, the table information transferred from the ECU via the reading unit 50 is notified to the user. Accordingly, the user easily grasps the correct information about the exchange and repair history of the ECUs constituting the vehicle control system 10.

In the above embodiment, the navigation apparatus is employed as the reading unit 50. However, in another embodiment, the reading unit 50 may be a reading dedicated terminal for reading the table information of the identification information table. The communication line 60 maybe connected to the reading dedicated terminal to read the table information from the identification information table of each ECU 20, 30, 40, . . . An indicator lamp disposed in an installment panel in front of the driver's seat may blink to clarify the exchange and repair history for each ECU from the time of new car to the present. With this configuration, the user is notified of the ECU that is exchanged or repaired. The information of the exchange and repair history is directly detected from the vehicle at no extra cost.

Also, in the above embodiment, the ID code assigned as the identification information to each ECU 20, 30, 40 is stored in the identification information table. However, in another embodiment, the ID code of each ECU and the ID code assigned to parts to be controlled (various sensors or actuators) may be stored. In this way, since ID code of the parts to be controlled is also stored, the details of the exchange and repair history information can be confirmed.

Also, in the above embodiment, this invention is applied to the vehicle control system. However, this invention may be also applied to a control system including a plurality of control apparatuses, which can communicate with each other. In this case, similar effect can be achieved.

What is claimed is:

1. A control apparatus comprising:
a communication unit for conducting data communication; and
a storage unit including a table storing identification information assigned to the control apparatus and identification information of another control apparatus.

2. A control system comprising:
a plurality of control apparatuses connected to each other to communicate with each other, wherein:
each of control apparatuses includes:
a first transmission unit for transmitting identification information of the control apparatus's own to the other control apparatuses;
a reception unit for receiving identification information of the other control apparatuses transmitted from the other control apparatuses; and
a first storage unit for storing the identification information of the control apparatus's own and the identification information of the other control apparatuses to which registration update information is added in a table of the control apparatus's own.

3. The system according to claim 2, wherein the first storage unit conducts the storage at a time of first energization after the control apparatuses are connected to each other.

4. The system according to claim 2, wherein:
each of control apparatuses further includes a comparison unit for comparing table information read out from the table of the control apparatus's own and table information read out from the table of the other control apparatuses; and
when each of comparison units concludes that at least one of the table information is different from the other table information, each of first storage unit stores all the identification information to which new registration update information is added in each of tables.

5. A control system comprising:
a plurality of control apparatuses connected to each other to communicate with each other, wherein:
each of control apparatuses includes:
a first transmission unit for transmitting identification information of the control apparatus's own to the other control apparatuses;
a reception unit for receiving identification information of the other control apparatuses transmitted from the other control apparatuses; and
a first storage unit for storing the identification information of the other control apparatuses to which registration update information is added in a table of the control apparatus's own.

6. The system according to claim 4, wherein the comparison units conducts the comparison at a predetermined timing.

7. The system according to claim 2, further comprising:
a reading unit for reading table information stored in each of tables of the control apparatuses, wherein:
the reading unit includes:
a transmission request unit for requesting at least one of the control apparatuses to transmit the table information stored in the table of the at least one of the control apparatuses;
a notification unit for notifying the table information, which is transmitted on the basis of the request by the transmission request unit; and
each of control apparatuses includes a third transmission unit for transmitting the table information stored in the control apparatus's own to the reading unit on the basis of the request by the transmission request unit.

8. The system according to claim 7, wherein the notification unit includes an indicator lamp mounted on a vehicle.

9. A control system comprising:
a first control apparatus; and
a second control apparatus connected to the first control apparatus, wherein:
each of first and second control apparatuses includes:
a first transmission unit;
a reception unit; and
a first storage unit;
the first transmission unit of the first control apparatus transmits identification information of the first control apparatus to the second control apparatus;
the first transmission unit of the second control apparatus transmits identification information of the second control apparatus to the first control apparatus;
the reception unit of the first control apparatus receives the identification information of the second control apparatus transmitted by the first transmission unit of the second control apparatus;
the reception unit of the second control apparatus receives the identification information of the first control apparatus transmitted by the first transmission unit of the first control apparatus;
the first storage unit of the first control apparatus stores into a table of the first control apparatus the identification information of the first and second control apparatuses to which registration update information is added; and
the first storage unit of the second control apparatus stores into a table of the second control apparatus the identification information of the first and second control apparatuses to which the registration update information is added.

10. The system according to claim 9, wherein the first storage unit of each of first and second control apparatuses conducts the storage at a time of first energization after the first and second control apparatus are connected to each other.

11. The system according to claim 9, wherein:
each of first and second control apparatuses further includes a comparison unit for comparing table information read from the table of the first control apparatus and table information read from the table of the second control apparatus;
when the comparison unit of the first control apparatus concludes that the table information of the first control apparatus is different from the table information of the second control apparatus, the first storage unit of the first control apparatus stores the identification information of the first and second control apparatuses to which new registration update information is added in the table of the first control apparatus; and
when the comparison unit of the second control apparatus concludes that the table information of the second control apparatus is different from the table information of the first control apparatus, the first storage unit of the second control apparatus stores the identification information of the first and second control apparatuses to which the new registration update information is added in the table of the second control apparatus.

12. The system according to claim 11, wherein:
each of first and second control apparatuses further includes:
a second transmission unit; and
a second store unit;
when the comparison unit of the first control apparatus concludes that the table information of the first control apparatus is different from the table information of the second control apparatus, the second transmission unit of the first control apparatus transmits history information stored in the table of the first control apparatus to the second control apparatus;
when the comparison unit of the second control apparatus concludes that the table information of the second control apparatus is different from the table information of the first control apparatus, the second transmission unit of the second control apparatus transmits history information stored in the table of the second control apparatus to the first control apparatus;
the second store unit of the first control apparatus stores the history information transmitted by the second transmission unit of the second control apparatus in the table of the first control apparatus; and
the second store unit of the second control apparatus stores the history information transmitted by the second transmission unit of the first control apparatus in the table of the second control apparatus.

13. The system according to claim 12, wherein each of comparison units conducts the comparison at a predetermined timing.

14. The system according to claim 9, further comprising a reading unit for reading table information stored in each of tables of the first and second control apparatuses, wherein:
the reading unit includes:
a transmission request unit for requesting at least one of the first and second control apparatuses to transmit the table information stored in the table of the at least one to the reading unit;
a notification unit for notifying the table information, which is transmitted on the basis of the request by the transmission request unit; and
each of first and second control apparatuses includes a third transmission unit for transmitting the table information stored in each of first and second control apparatuses to the reading unit on the basis of the request by the transmission request unit.

15. The system according to claim 14, wherein the notification unit includes an indicator lamp mounted on a vehicle.

16. The control apparatus according to claim 1, wherein the storage unit includes a table storing exchange and repair history of the control apparatus and exchange and repair history of another control apparatus.

17. The control system according to claim 2, wherein each of the control apparatuses includes an output unit to output a control signal to at least one actuator.

18. The control system according to claim 9, wherein each of the first and second control apparatuses include an output unit to output a control signal to at least one actuator.

19. The control apparatus according to claim 1, wherein the storage unit stores identification information assigned to parts being controlled by the control apparatus.

20. The control apparatus according to claim 1, wherein the storage unit stores identification code of parts controlled by the other control apparatuses, so that details of an exchange and repair history information can be confirmed.

* * * * *